(12) United States Patent
Villanueva

(10) Patent No.: US 7,926,533 B2
(45) Date of Patent: Apr. 19, 2011

(54) PNEUMATIC TIRE WITH INCREASED LOWER SIDEWALL DURABILITY

(75) Inventor: Roel Domingo Villanueva, Hudson, OH (US)

(73) Assignee: The Goodyear Tire & Rubber Company, Inc., Akron, OH (US)

( * ) Notice: Subject to any disclaimer, the term of this patent is extended or adjusted under 35 U.S.C. 154(b) by 637 days.

(21) Appl. No.: 11/930,952

(22) Filed: Oct. 31, 2007

(65) Prior Publication Data
US 2009/0151843 A1 Jun. 18, 2009

(51) Int. Cl.
*B60C 15/00* (2006.01)
*B60C 15/06* (2006.01)
*B29D 30/06* (2006.01)

(52) U.S. Cl. ........ 152/539; 152/542; 152/546; 152/555; 156/110.1; 156/123

(58) Field of Classification Search .................. 152/539, 152/540, 541, 542, 543, 544, 545, 546, 547, 152/550, 551, 552, 553, 554–555; 156/110.1, 156/123
See application file for complete search history.

(56) References Cited

U.S. PATENT DOCUMENTS

| | | | |
|---|---|---|---|
| 3,645,314 A | 2/1972 | Verdier | |
| 4,046,183 A * | 9/1977 | Takahashi et al. | 152/541 |
| 4,312,395 A | 1/1982 | Baus | |
| 4,462,445 A | 7/1984 | Goergen | |
| 4,823,855 A | 4/1989 | Goergen et al. | |
| 4,832,101 A | 5/1989 | Welter | |
| 4,982,773 A | 1/1991 | Bonko | |
| 5,085,259 A | 2/1992 | Goergen et al. | |
| 5,109,903 A | 5/1992 | Watanabe et al. | |
| 5,198,047 A | 3/1993 | Graas et al. | |
| 5,358,021 A | 10/1994 | Takasugi et al. | |
| 5,647,926 A | 7/1997 | van der Meer et al. | |
| 5,658,404 A | 8/1997 | Brown et al. | |
| 5,669,994 A * | 9/1997 | Tsuruta | 152/541 |
| 5,833,779 A | 11/1998 | van der Meer et al. | |
| 5,958,162 A | 9/1999 | Creech | |
| 6,135,183 A | 10/2000 | Oare | |
| 6,189,586 B1 | 2/2001 | Guidry | |
| 6,298,890 B1 | 10/2001 | Binsfeld | |
| 6,520,230 B1 | 2/2003 | Ratliff, Jr. | |
| 6,530,405 B1 | 3/2003 | Brown et al. | |
| 7,134,467 B2 | 11/2006 | Neubauer et al. | |
| 7,152,641 B2 | 12/2006 | Ooyama | |
| 7,178,570 B2 | 2/2007 | Murata | |
| 2003/0041943 A1 | 3/2003 | Ueyoko | |
| 2006/0137790 A1 | 6/2006 | de Barsy | |

FOREIGN PATENT DOCUMENTS

| | | |
|---|---|---|
| EP | 1452346 | 9/2004 |
| EP | 1800901 | 6/2007 |
| JP | 2006-290080 | * 10/2006 |

OTHER PUBLICATIONS

Machine translation of JP 2006-290080, 2006.*

* cited by examiner

*Primary Examiner* — Justin Fischer
(74) *Attorney, Agent, or Firm* — Roger D. Emerson; Timothy D. Bennett; Emerson Thomson Bennett

(57) ABSTRACT

A pneumatic tire may use a combination of high modulus and low modulus plies to provide increased fatigue compression durability without significantly increasing the weight of the tire.

10 Claims, 5 Drawing Sheets

PNEUMATIC TIRE WITH INCREASED LOWER SIDEWALL DURABILITY

BACKGROUND OF THE INVENTION

A. Field of Invention

This invention pertains to the art of methods and apparatuses regarding the manufacture and assembly of tires, and more particularly to methods and apparatuses regarding the manufacture of pneumatic tires requiring increased lower sidewall durability.

B. Description of the Related Art

It is known that certain pneumatic tires, such as those suitable for use on an aircraft, are subjected to operating conditions which include relatively high internal pressures, relatively high speeds (often in excess of 300 kilometers per hour), and relatively high deflections. During the taxiing and taking off of an aircraft, the tire deflection may be more than 30%, and on landing may be 45% or more under impact conditions. Such relatively extreme pressures, loads, and deflections put the lower sidewall area of the tire adjacent the beads under severe tests. The high inflation pressures cause large tensile forces in this bead area while the high deflection rates cause high compressive forces in the axially outer portion of the bead area. These extreme operating conditions can tend to decrease the durable life of the lower sidewall and bead areas. As used herein, an "aircraft tire" or a "pneumatic tire suitable for use on an aircraft" is understood to mean a tire of a size and strength specified for use on an aircraft in either the Yearbook of the Tire and Rim Association, Inc., or the Yearbook of the European Tyre and Rim Technical Organization published in the year that the tire is manufactured.

Commonly, the number of plies (carcass plies) placed in the lower sidewall area of a pneumatic tire requiring increased lower sidewall durability, such as an aircraft tire, have been increased and additional reinforcement plies have been added in the bead area in order to increase rigidity and to decrease deformation of the pneumatic tire under load. Typically, both the carcass plies and the reinforcement plies are comprised of the same tire cord fabric. The tire cord fabric may consist of a pair of (ply) cords extending diagonally across the pneumatic tire. These ply cords may extend from a first bead structure to a second bead structure at about a 80°-90° angle with respect to the equatorial plane of the aircraft tire. Each individual ply cord of a particular ply may be at the same angle, but run in the opposite direction, with respect to the other individual ply cord.

Recently, it has become known to use a relatively high modulus tire cord fabric, such as aramid, in constructing both the carcass and reinforcement plies. The high modulus cords may be embedded in an elastomeric material and there may be a plurality of cord ends per inch of elastomeric material. The modulus of a material may generally be defined as the ratio of stress to strain within the linear elastic range of such material. The strain can be defined as the change in length of the material, as a result of the stress, divided by the original length of the material. As applied to tire fabric cord or cable, the cord modulus is the ratio of its longitudinal stress to the resulting strain within the elastic limit of the cord material. A ply of parallel cords also has a corresponding modulus. The ply modulus is equal to the cord modulus multiplied by the cord end count, which may be defined as the number of cord ends per inch, in the ply. Plies made of higher modulus cords (high modulus plies) are currently favored over plies made of lower modulus cords (low modulus plies). High modulus plies are of relatively lower weight and melt at a higher temperature than low modulus plies. The higher melting temperature results in the plies being more resistant to flat-spotting. A method of tire design using high modulus plies is provided in U.S. Pat. No. 6,427,741 titled AIRCRAFT TIRE, which is hereby incorporated by reference.

Although many known pneumatic tires requiring increased lower sidewall durability, such as an aircraft tire, work well for their intended purpose, they do have disadvantages. One disadvantage to using high modulus plies in the construction of aircraft tires is their lower fatigue compression durability as compared to low modulus plies. Lower fatigue compression durability of the plies may cause a premature removal of an aircraft tire from an aircraft liner. This premature removal results in a higher operating cost to the airlines and, may offset and reduced costs to the airlines resulting from the decreased weight of the high modulus plies.

What is needed then is a pneumatic tire with a higher fatigue compression durability without a significant increase in the overall weight of the tire. In providing this higher fatigue compression durability, it is desirable that the tire's footprint is not significantly reduced. Further, it is desirable to localize the compression loading of the pneumatic tire.

SUMMARY OF THE INVENTION

According to one embodiment of this invention, a pneumatic tire has a sidewall structure portion, a tread structure portion, a belt structure portion, and a carcass structure portion. The carcass structure portion has a bead core, an apex, and a carcass reinforcement portion. The carcass reinforcement portion has a first, a second, a third and a fourth high modulus up ply; a first and a second high modulus down ply; and, a first and a second low modulus chipper. The second low modulus chipper is axially outward from the second high modulus down ply and the first low modulus chipper is axially inward from the second high modulus down ply and axially outward from the first high modulus down ply. In another embodiment of the invention, the pneumatic tire comprises an aircraft tire.

According to another embodiment of this invention, a pneumatic tire has a sidewall structure portion, a tread structure portion, a belt structure portion, and a carcass structure portion. The carcass structure portion has a bead core, an apex, and a carcass reinforcement portion. The carcass reinforcement portion has a first, a second, a third and a fourth high modulus up ply; a first and a second high modulus down ply; and, a first and a second low modulus chipper. The second low modulus chipper is axially outward from the second high modulus down ply and the first low modulus chipper is axially inward from the second high modulus down ply and axially outward from the first high modulus down ply. The first high modulus up ply has a first turn-up portion, the second high modulus up ply has a second turn-up portion, the third high modulus Up ply has a third turn-up portion, and the fourth high modulus up ply has a fourth turn-up portion. The distance the first turn-up portion extends radially outward from the center of the bead core is about ⅓ of the diameter of the bead core. The distance the second turn-up portion extends radially outward from the center of the bead core is greater than ½ of the diameter of the bead core and less than the distance the third turn-up portion extends radially outward from the center of the bead core. The distance the third turn-up portion extends radially outward from the center of the bead core is greater than ½ of the diameter of the bead core and less than ½ of the radial height of the apex. The distance the fourth turn-up portion extends radially outward from the center of the bead core is about ¼ of the diameter of the bead core. The distance the first low modulus chipper extends radially outward from the center of the bead core is about ½ of the section height of the pneumatic tire. The distance the second low modulus chipper extends radially outward from the center of the bead core is greater than the radial height of the apex plus 1.5 inches and less than the distance the first low modulus chipper extends radially outward from the center of the bead core. The end of the second high modulus down ply is located a distance radially outward from the center of the bead core that is greater than the radial height of the apex plus about 1.0 inches. The end of the first high modulus down ply is located radially outward from the end of the second high modulus down ply. The first low modulus chipper may extend at least 0.5 inches radially outward from the end of the first high modulus down ply. The second low modulus chipper may extend at least 0.5 inches radially outward from the end of the second high modulus down ply. The radial distance between the end of the second low modulus chipper and the end of the first high modulus down ply may be at least 0.25 inches.

According to another embodiment of this invention, a pneumatic tire may have a sidewall structure portion, a tread structure portion, and a carcass structure portion. The carcass structure portion may have a first high modulus up ply, a first high modulus down ply, and a first low modulus chipper.

According to another embodiment of this invention, a pneumatic tire may have a sidewall structure portion, a tread structure portion, and a carcass structure portion. The carcass structure portion may have a first high modulus up ply, a first high modulus down ply, a second high modulus down ply, and a first low modulus chipper. The first low modulus chipper is axially outward from the first high modulus down ply and axially inward from the second high modulus down ply.

According to another embodiment of this invention, a pneumatic tire may have a sidewall structure portion, a tread structure portion, and a carcass structure portion. The carcass structure portion may have a first high modulus up ply, a first high modulus down ply, a first low modulus chipper, and a second low modulus chipper. The second low modulus chipper is axially outward from the second high modulus down ply.

According to another embodiment of this invention, a pneumatic tire may be an aircraft tire having a sidewall structure portion, a tread structure portion, and a carcass structure portion. The carcass structure portion may have a first high modulus up ply, a first high modulus down ply, and a first low modulus chipper. The first high modulus up ply and the first high modulus down ply comprise an aramid and the first low modulus chipper comprises a nylon.

According to another embodiment of this invention, a pneumatic tire may be an aircraft tire having a sidewall structure portion, a tread structure portion, and a carcass structure portion. The carcass structure portion may have at least a first high modulus up ply, at least a first high modulus down ply, and a first low modulus chipper. The high modulus up plies and the high modulus down plies comprise an aramid and the first low modulus chipper comprises a nylon.

According to another embodiment of this invention, a pneumatic tire may be an aircraft tire having a sidewall structure portion, a tread structure portion, and a carcass structure portion. The carcass structure portion may have at least a first high modulus Up ply, at least a first high modulus down ply, a first low modulus chipper, and a second low modulus chipper. The at least a first high modulus up plies and the at least a first high modulus down plies comprise an aramid and the first and the second low modulus chippers comprise a nylon. The first low modulus chipper is axially outward from all of the high modulus down plies and the second low modulus chipper is axially inward from at least one of the first high modulus down plies.

According to one embodiment of this invention, a method of constructing a pneumatic tire includes applying an inner liner, applying a carcass structure, applying a belt package, and applying a tread structure. The carcass structure has a carcass reinforcement portion that has a first high modulus up ply, a first high modulus down ply, and a first low modulus chipper.

According to another embodiment of this invention, a method of constructing a pneumatic tire includes applying an inner liner, applying a carcass structure, applying a belt package, and applying a tread structure. The carcass structure has a carcass reinforcement portion that has a first high modulus up ply, a first high modulus down ply, a second high modulus down ply, a first low modulus chipper, and a second low modulus chipper. The second low modulus chipper is axially outward from the second high modulus down ply and the first low modulus chipper is axially inward from the second high modulus down ply and axially outward from the first high modulus down ply.

According to another embodiment of this invention, a method of constructing a pneumatic tire includes applying an inner liner, applying a carcass structure, applying a belt package, and applying a tread structure. The carcass structure has a carcass reinforcement portion that has a first high modulus up ply, a first high modulus down ply, a second high modulus down ply a first low modulus chipper, and a second low modulus chipper. The second low modulus chipper is axially outward from the second high modulus down ply and extends at least 0.5 inches radially outward from the end of the second high modulus down ply. The first low modulus chipper is axially inward from the second high modulus down ply and axially outward from the first high modulus down ply and extends at least 0.5 inches radially outward from the end of the first high modulus down ply.

According to another embodiment of this invention, a method of constructing a pneumatic tire includes applying an inner liner, applying a carcass structure, applying a belt package, and applying a tread structure. The carcass structure has a carcass reinforcement portion that has a first high modulus Up ply, a first high modulus down ply, a second high modulus down ply a first low modulus chipper, and a second low modulus chipper. The second low modulus chipper is axially outward from the second high modulus down ply and extends at least 0.5 inches radially outward from the end of the second high modulus down ply. The first low modulus chipper is axially inward from the second high modulus down ply and axially outward from the first high modulus down ply and extends at least 0.5 inches radially outward from the end of the first high modulus down ply. The radial distance between the end of the second low modulus chipper and the end of the first high modulus down ply is at least 0.25 inches.

One advantage of this invention is that the pneumatic tire has a higher fatigue compression durability than that of a pneumatic tire comprised entirely of high modulus plies without a significant increase in the overall weight of the vehicle tire. The invention may instead result in a weight savings of as much as 15% over the conventional low modulus pneumatic tire. For example, the inventor has discovered that the inventive tire could yield a decrease in tire weight of about 50 pounds as compared to a tire (1400×530R23 40 pr 235 mph, 300 lbs) comprised of all low modulus materials. By ensuring that the weight of an inventive pneumatic tire suitable for use on an aircraft is not significantly increased, any savings resulting from the aircraft tire's higher fatigue compression durability is not negated by other factors, for example, higher fuel expenditures, resulting from the increased weight of the aircraft tire. Further, any additional increase in the weight of the aircraft tire is contrary to the aircraft tire design parameter for minimizing the weight of the airliner.

Another advantage of this invention is that the invention's higher fatigue compression durability significantly reduces the occurrence of premature removal of an aircraft tire from an aircraft. A higher fatigue compression durability increases the number flexes an aircraft tire may endure prior to a significant increase in the risk of tire failure resulting from the compression forces occurring during taxiing, take-off, and landing.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DEFINITIONS

Figure 1:
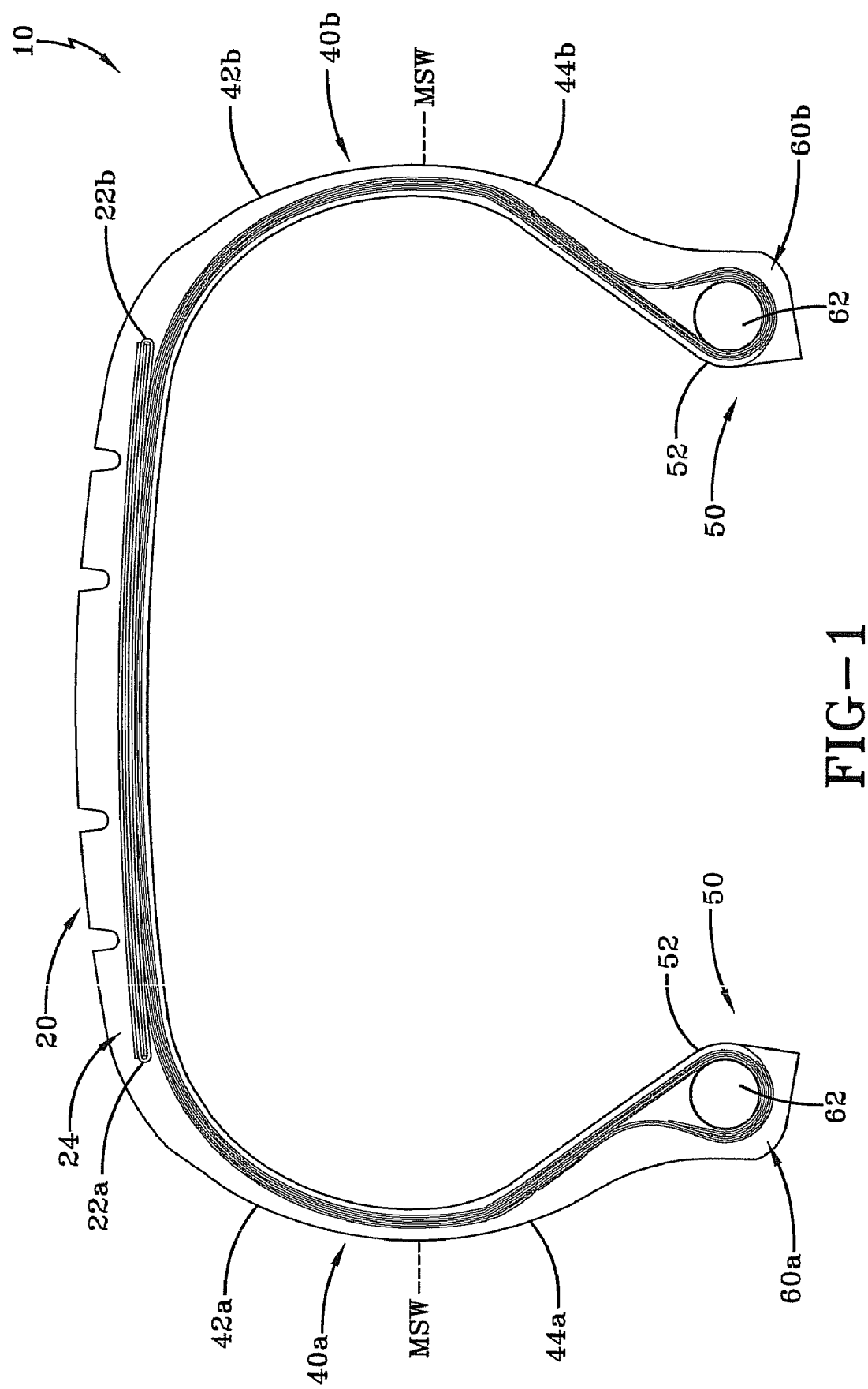
FIG. 1 is a cross-sectional view of a pneumatic tire taken in an axial plane showing one embodiment of this invention.

The following terms may be used throughout the descriptions presented herein and should generally be given the following meaning unless contradicted or elaborated upon by other descriptions set forth herein.

"Aircraft Tire" means a tire of a size and strength specified for use on an aircraft in either the Yearbook of the Tire and Rim Association, Inc., or the Yearbook of the European Tyre and Rim Technical Organization published in the year that the tire is manufactured. Generally, an aircraft tire has a laminated mechanical device of generally toroidal shape, usually an open-torus having beads and a tread and made of rubber, chemicals, fabric, and perhaps steel or other materials.

"Apex" means a wedge of elastomeric material placed beside (radially above the bead or bead core) the bead (or bead core) that supports the bead-area and minimizes flexing in the bead-area.

"Axial" and "axially" means lines or directions that are parallel to the axis of rotation of the tire.

"Bead" or "bead core" means that part of the tire comprising an annular tensile member wrapped by ply cords and shaped, with or without other reinforcement elements such as flippers, chippers, apexes or fillers, toe guards and chafers to fit the design rim.

"Belt" means at least two layers of plies of parallel cords, woven or unwoven, underlying the tread, unanchored to the bead, and having both left and right cord angles in the range from 17° to 33° with respect to the equatorial plane of the tire.

"Carcass" means the tire structure apart from the belt structure, tread, undertread, and sidewall rubber over the plies, but including the beads.

"Chafers" refers to narrow strips of material placed around the outside of the bead to protect cord plies from the rim, distribute flexing above the rim, and to seal the tire.

"Chipper" means a reinforcement structure located in the bead portion of the tire.

"Circumferential" means circular lines or directions extending along the surface of the sidewall perpendicular to the axial direction.

"Cord" means one of the reinforcement strands of which the plies in the tire are comprised.

"Crown" refers to substantially the outer circumference of a tire where the tread is disposed.

"Equatorial Plane (EP)" means the plane perpendicular to the tire's axis of rotation and passing through the center of its tread.

"Flipper" means an additional reinforcement (usually fabric) that is placed around the bead/apex and, usually, between the bead/apex and the carcass ply.

"Footprint" means the contact patch or area of contact of the tire tread with a flat surface at zero speed and under normal load and pressure.

"Inner" means toward the inside of the tire.

"Modulus" or "stress-strain ratio" means the modulus of elasticity of a material or the rate of change of strain as a function of stress. For purposes of this patent, a low or lower modulus material refers to a material with a modulus of elasticity less than 19 Giga Pascal (GPa) and high or higher modulus material refers to any material having a modulus of elasticity greater than 19 GPa.

"Nominal Rim Diameter" means the average diameter of the rim flange at the location where the bead portion of the tire seats.

"Outer" means toward the tire's exterior.

"Ply" means a continuous layer of rubber-coated parallel cords.

"Radial" and "radially" mean directions radially toward or away from the axis of rotation of the tire.

"Section Height" means the radial distance from the nominal rim diameter to the outer diameter of the tire at its equatorial plane.

"Shoulder" means the upper portion of sidewall just below the tread edge.

"Sidewall" means that portion of a tire between the tread and the bead area.

"Tenacity" means the stress expressed as force per unit linear density of an unstrained specimen (gm/tex or gm/denier), (usually used in textiles).

"Tread" means a molded rubber component which, when bonded to a tire casing, includes that portion of the tire that comes into contact with the road when the tire is normally inflated and under normal load.

DETAILED DESCRIPTION OF THE INVENTION

Referring now to the drawings wherein the showings are for purposes of illustrating embodiments of the invention only and not for purposes of limiting the same, FIG. 1 shows a pneumatic tire suitable for use as an aircraft tire 10 including a carcass structure 50 that may comprise high modulus up and down plies and a low modulus chipper that may be "sandwiched" or in between the high modulus up plies, made in accordance with one embodiment of this invention. While the tire shown is an aircraft tire, it is understood that the invention may be practiced with respect to tires intended for other applications also, such as passenger vehicle tires, light truck or sport utility vehicle tires, truck tires, agricultural tires, tires used on construction equipment, or on any type of tire chosen with sound engineering judgment. The aircraft tire 10 may comprise a tread structure 20, a belt package 24, a pair of sidewall structures 40a, 40b, and the carcass structure 50. The tread structure 20 may be located in the crown of the aircraft tire 10 and may extend circumferentially about the aircraft tire 10. The tread structure 20 may be a molded rubber, ground-engaging component and may provide traction for the aircraft tire 10.

Figure 2:
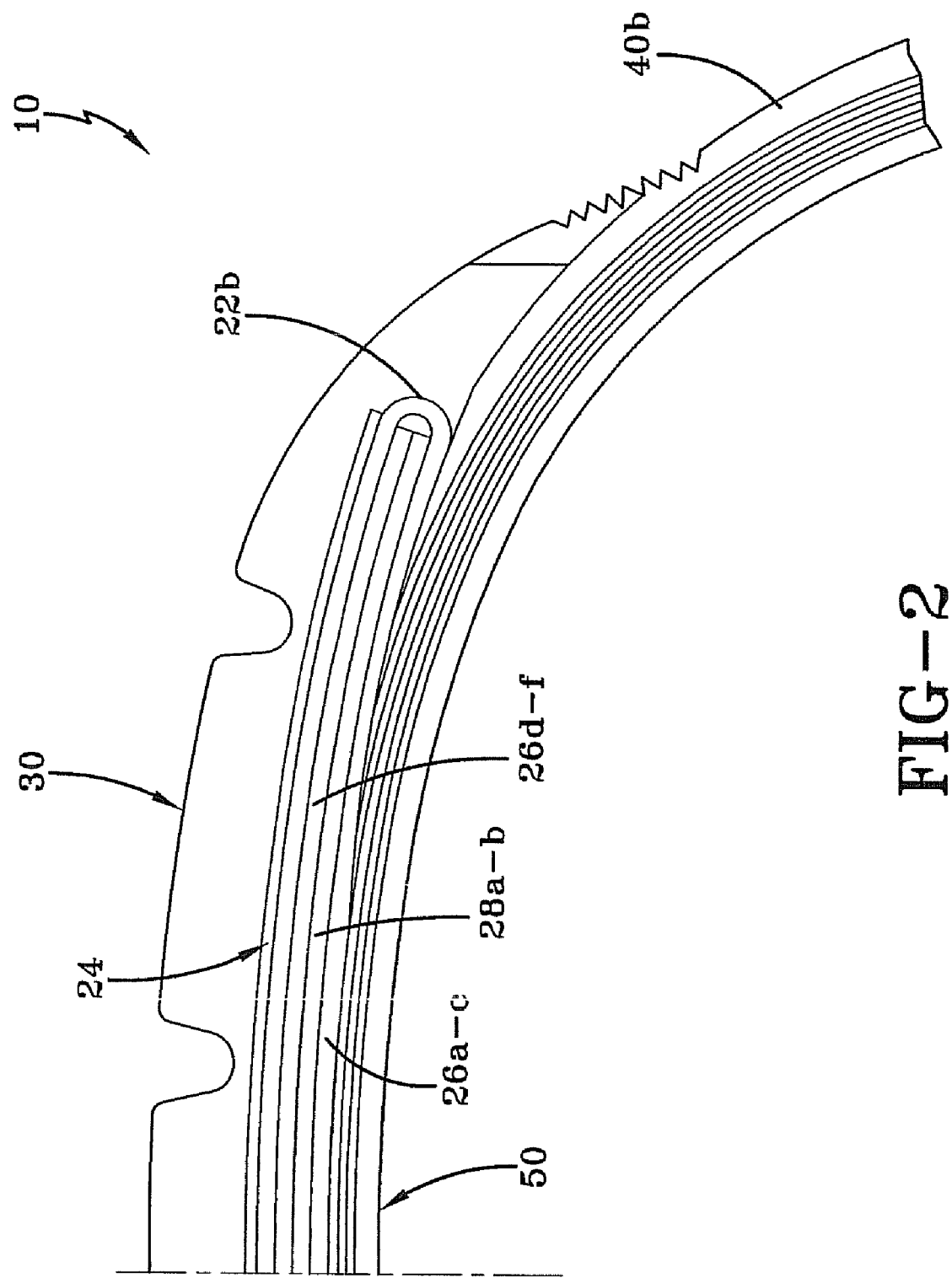
FIG. 2 is an enlarged cross-sectional view of a part of the crown and upper sidewall region of the pneumatic tire shown in FIG. 1.

With reference now to FIGS. 1-2, the belt package 24 may be arranged between the carcass structure 50 and the tread portion 30. The belt package 24 may be characterized by a plurality of plies of parallel cords, or belt layers, woven or unwoven, and unanchored to a bead core 62. In one embodiment, the belt package 24 may comprise, for example, six zigzag belt plies 26a, 26b, 26c, 26d 26e, and 26f and two spiral wound belt layers 28a, 28b. The spiral wound belt layers 28a, 28b may be positioned radially outward from the zigzag belt layers 26a-26f. The number and type of belt layers comprising the belt package 24 may vary according to the specific tire construction.

With reference now to FIG. 1, the sidewall structures 40a, 40b may extend radially inwardly from the axially outer edges 22a, 22b of the tread structure 20 and terminate at their radial extremities in a bead portions 60a, 60b of the carcass structure 50. The sidewall structures 40a, 40b may have upper portions 42a, 42b and lower portions 44a, 44b. The upper portions may be located radially inward of the tread structure 20 and radially outward of a maximum section width MSW of the aircraft tire 10. The lower portions 44a, 44b may be radially inward of the maximum section width MSW and radially outward of the bead portions 60a, 60b.

Figure 3:
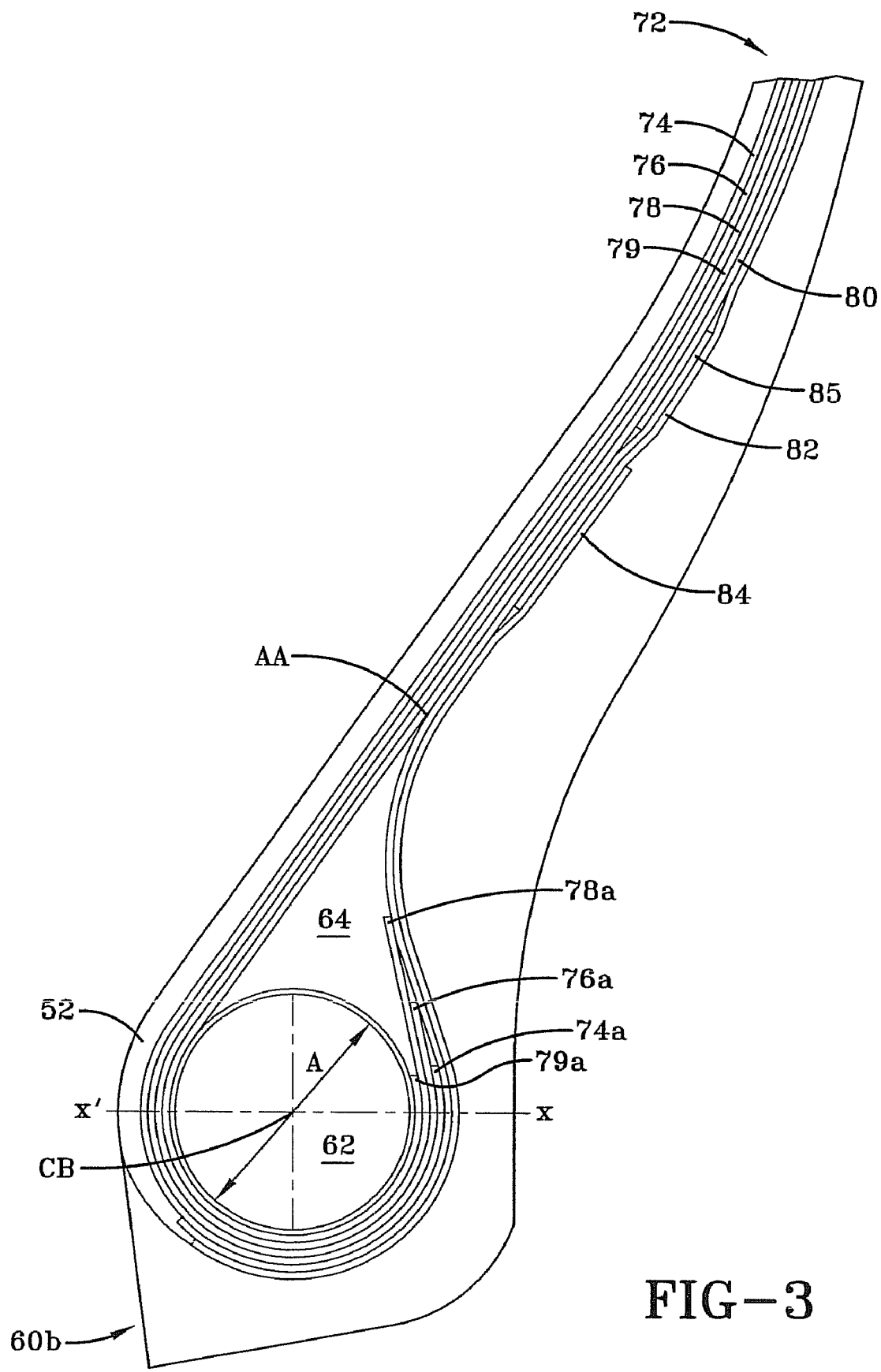
FIG. 3 is an enlarged cross-sectional view of a part of the lower sidewall and bead region of the pneumatic tire shown in FIG. 1.
Figure 4:
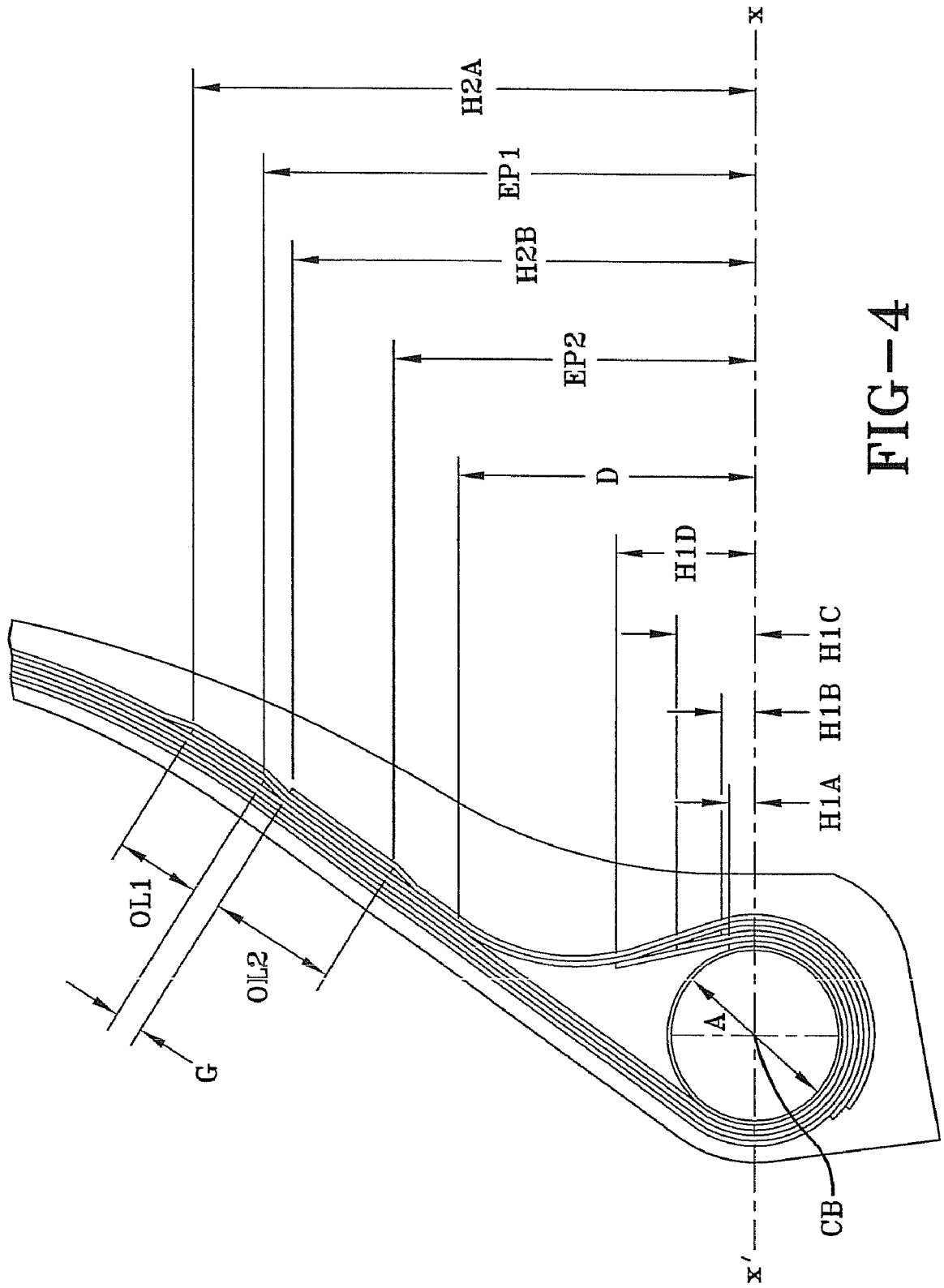
FIG. 4 is a diagrammatical view of the part of the lower sidewall and bead region of the pneumatic tire shown in FIG. 3.
Figure 5:
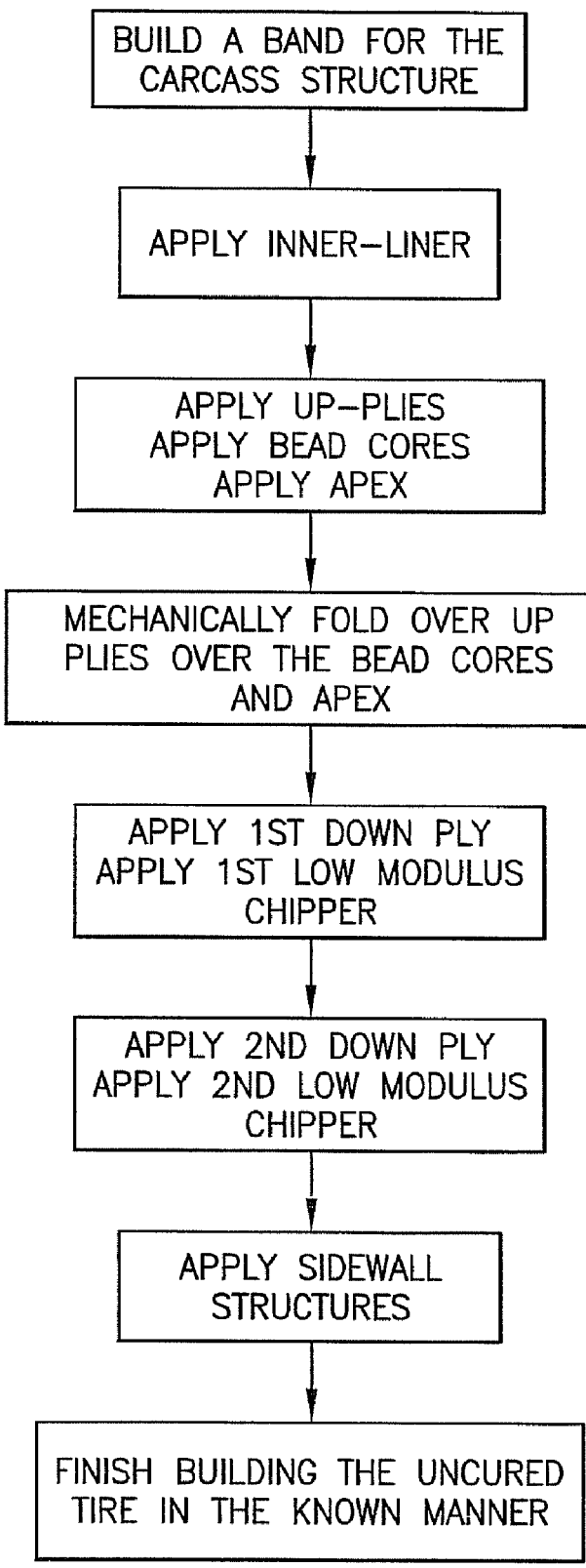
FIG. 5 is a block diagram of a method of building an pneumatic tire in accordance with one embodiment of the invention.

With reference now to FIGS. 1, 3-4, the carcass structure 50 may be cord-reinforced and may extend circumferentially about the aircraft tire 10 and may extend axially from the bead portion 60a to the bead portion 60b. The carcass structure 50 may comprise the bead portions 60a, 60b, an inner-liner 52, and a carcass reinforcement structure 70. The inner-liner 52 may be radially inward from the carcass reinforcement structure 70 and may surround an air chamber (not shown) formed by the aircraft tire 10 when mounted on a suitable rim (not shown). The inner-liner 52 may be generally air impervious and may extend from bead portion 60a to bead portion 60b.

With continued reference to FIGS. 1, 3-4, the bead portions 60a, 60b may each comprise a bead core 62, and an apex 64. The bead core 62 may be an annular inextensible structure and may comprise a circular cross section that may extend circumferentially around the aircraft tire 10. In another embodiment, the bead portions 60a, 60b may comprise a plurality of bead cores, for example two (2) or three (3) and may comprise various cross-sectional shapes such as hexagonal or oval. The bead portions 60a, 60b may comprise any number of bead cores or any cross-sectional shape chosen with sound engineering judgment. The apex 64 may be located directly adjacent to and radially outward from the bead core 62. The apex 64 may comprise an elastomeric material and may have substantially the shape of a triangle.

With continued reference to FIGS. 1, 3, and 4, the carcass reinforcement structure 70 may comprise a plurality of carcass plies 72. The plurality of carcass plies 72 may be comprised of high modulus cords or cables, for example, aramid or steel, or any other high modulus material having similar properties, or a combination of such high modulus materials, chosen with sound engineering judgment. Such high modulus cords may comprise any suitable denier and any suitable twist and may be treated to increase their bond strength to rubber. Additionally, aramid cords may be coated with an adhesive or an adhesive/epoxy combination.

With continued reference to FIGS. 1, 3, and 4, the plurality of carcass plies 72 may comprise up plies (also known as inner plies) and down plies (also known as outer plies). In one embodiment, the carcass reinforcement structure 70 may comprise a first up ply 74, a second up ply 76, a third up ply 78, and a fourth up ply 79 as well as a first down ply 80, and a second down ply 82. In another embodiment, the carcass structure 70 comprises one up ply and one down ply. The carcass reinforcement structure 70 may comprise any number of up plies and down plies chosen with sound engineering judgment. The plurality of carcass plies 72 may be positioned such that the first up ply 74 is the axially innermost carcass ply, the second up ply 76 may be positioned axially outward from the first up ply 74 and axially inward from the third up ply 78, and the fourth tip ply 79 may be positioned axially outward from the third up ply 78. The down plies may be positioned such that the first down ply 80 is positioned axially outward from the fourth up ply 79 and axially inward from the second down ply 82. The second down ply 82 may be the axially outermost carcass ply.

With continued reference to FIGS. 1, 3, and 4, the up plies 74, 76, 78, and 79 may extend radially inward along the axially inner side of a bead core 62. The up plies 74, 76, 78 and 79 may bend around the bead core 62 and begin to extend radially outward along the axially outer side of the bead core 62 and may form a first, second, third, and fourth turn-up 74a, 76a, 78a, and 79a. The first, second, third, and fourth turn-ups 74a, 76a, 78a, and 79a may extend to any point chosen with sound engineering judgment. In one embodiment of the invention, the first turn-up 74a may extend to a point radially outward from the reference line XX'. The distance H1B that the first turn-up 74a extends radially outward from the reference line XX' may be determined to be equal to ⅓ of a bead core diameter A. In another embodiment of the invention, the second turn-up 76a may extend to a point radially outward from the reference line XX' (A/3). The distance H1C that the second turn-up 76a extends radially outward from the reference line XX' may be determined to be greater than ½ of the bead core diameter A but less than a distance H1D that the third turn-up 78a extends radially outward from the reference line XX' ((A/2)<H1C<H1D). In another embodiment of the invention, the third turn-up 78a may extend to a point radially outward from the reference line XX'. The distance H1D that the third turn-up 78a extends radially outward from the reference line XX' may be determined to be greater than ½ of the bead core diameter A but less than the a distance equal to ½ of an apex height D corresponding to the distance that a radially outermost point AA of the apex 64 extends radially outward from the reference line XX' ((A/2)<H1D<(D/2)). In yet another embodiment of the invention, the fourth turn-up 79a may extend to a point radially outward from the reference line XX'. The distance H1A that the fourth turn-up 79a extends radially outward from the reference line XX' may be determined to be equal to ¼ of the bead core diameter A (A/4).

With continued reference to FIGS. 1, 3, and 4, the down plies 80, 82 may extend radially inward along the axially outer side of the up plies 74, 76, 78 and 79. The down plies 80, 82 may extend such that the ends of the down plies 80, 82 are situated radially above the reference line XX'. The down plies 80, 82 may extend such that their ends are positioned at any point chosen with sound engineering judgment. A first chipper 85 may be axially inward from the first down ply 80 and axially outward from the second down ply 82 thereby separating the first down ply 80 and the second down ply 82. A second clipper 84 may be axially outward from the first down ply 80 such that the first chipper 85 and the second chipper 84 may be said to "sandwich" the first down ply 80. The first chipper 85 and the second chipper 84 may be low modulus chippers. In one embodiment of the invention, the Up plies 74, 76, 78, and 79 and the down plies 80, 82 may be comprised of an aramid and the first chipper 85 and the second chipper 84 may be comprised of a nylon. The ends of the first chipper 85 and the second chipper 84 may be positioned at any location chosen with sound engineering judgment. In one embodiment of the invention, the end of the first chipper 85 may be located a distance H2A radially above the reference line XX'. The distance H2A may correspond to a value that is less than ½ of the section height SH of the aircraft tire 10 (H2A<(SH/2)). In another embodiment of the invention, the end of the second chipper 84 may be located a distance H2B radially above the reference line XX'. The distance H2B may correspond to a value that is greater than the apex height D plus 1.5 inches but less than the distance H2A ((D+1.5") <H2B<H2A).

With continued reference to FIGS. 1, 3, and 4, in one embodiment of the invention, the end of the second down ply 82 may be located a distance EP2 above the reference line XX'. The distance EP2 may correspond to a value that is greater than the apex height D plus 1.0 inches (EP2>(D+ 1.0")). In another embodiment of the invention, the end of the first down ply 81 may be located a distance EP1 above the reference line XX'. The distance EP1 may correspond to a value that is greater than the distance H2A and is also greater than the distance EP2 (EP1>H2A, EP1>EP2). In one embodiment of the invention, the first down ply 80 may comprise an overlap portion OL1 in which the first chipper 85 overlaps or covers the first down ply 80. In another embodiment of the invention, the second down ply 82 may comprise an overlap portion OL2 in which the second chipper 84 overlaps or covers the second down ply 82. In one embodiment of the invention, the first and second overlap portions OL1, OL2 may be at least 0.5 inches. The first and second overlap portions OL1, OL2 may comprise any amount of overlap chosen with sound engineering judgment. The end of the second chipper 84 and the end of the first down ply 80 may be separated by a distance G. In one embodiment of the invention, the distance G between the end of the second chipper 84 and the end of the first down ply 80 may be at least 0.25 inches. The end of the second chipper 84 and the end of the first down ply 80 may be separated by any distance chosen with sound engineering judgment.

With reference now to FIGS. 1-5, a method for manufacture of an aircraft tire according to one embodiment of the invention will generally be described. Two stage tire building utilizing either a first stage tire drum in combination with a second stage tire drum or a single drum that can be moved from a first stage position to a second stage position, is well known. The first stage may comprise the step of building a band for the carcass structure 50 that includes the inner-liner 52 and the carcass reinforcement structure 70. Band building is well known in the art. One method of band building may comprise the use of a belt or a collapsible drum to which the inner-liner 52 may be applied. The inner-liner 52 may be applied in the form of a continuous sheet followed by the application of the up plies 74, 76, 78 and 79. The up plies 74, 76, 78 and 79 may be applied offset from each other with respect to the inner-liner 52. Following the application of the up plies 74, 76, 78 and 79, the bead cores 62 may be applied followed by the apex 64. In one embodiment, the up plies 74, 76, 78 and 79 may then be turned around the bead cores 62 in order to form their respective turn-ups 74a, 76a, 78a, and 79a.

With continued reference to FIGS. 1-5, the up plies 74, 76, 78 and 79, may be mechanically folded over the bead cores 62 and the apex 64. Next, the first down ply 80 may be applied followed by the application of the first low modulus chipper 85. The second down ply 82 may then be applied followed by the application of the second low modulus chipper 84. The first chipper 85 and the second chipper 84 and the first and second down plies 80, 82 may be positioned offset from each other to allow for their respective ends to extend to their respective points as described above. The low modulus first chipper 85 and the low modulus second chipper 84 may be turned atop of the up plies 74, 76, 78 and 79. In another embodiment of the invention, the second down ply 82 and the second low modulus chipper 84 may be applied prior to the first down ply 80 and the first low modulus chipper 85. Following the application of the down plies 80, 82 and the low modulus chippers 84, 85, the sidewall structures 40a, 40b may be applied. A second stage may include assembling the tread structure 20 together with the belt package 24 and combining them with the carcass structure 50 and the sidewall structures 40a, 40b assembled in the first step, utilizing known methods to form the uncured, or green, aircraft tire 10.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:
1. A pneumatic tire comprising:
a sidewall structure portion;
a tread structure portion;
a belt structure portion; and,
a carcass structure portion comprising: a bead core; an apex; and, a carcass reinforcement portion comprising:
a first, a second, a third, and a fourth high modulus up ply;
a first and a second high modulus down ply; and,
a first and a second low modulus chipper,
wherein the second low modulus chipper is axially outward from the second high modulus down ply and the first low modulus chipper is axially inward from the second high modulus down ply and axially outward from the first high modulus down ply; and
wherein the tire comprises at least one from the group comprising:
  (i) wherein the distance the first low modulus chipper extends radially outward from the center of the bead core is about ½ of the section height of the pneumatic tire;
  (ii) wherein the distance the second low modulus chipper extends radially outward from the center of the bead core is greater than the height of the apex plus 1.5 inches and less than the distance the first low modulus chipper extends radially outward from the center of the bead core;
  (iii) wherein the end of the second high modulus down ply is located a distance radially outward from the center of the bead core that is at least the radial height of the apex plus about 1.0 inches; and

(iv) wherein the end of the first high modulus down ply is located radially outward from the end of the second high modulus down ply and the end of the second low modulus chipper.

2. The pneumatic tire of claim 1, wherein the pneumatic tire comprises an aircraft tire.

3. The pneumatic tire of claim 1, wherein:
the first high modulus up ply comprises a first turn-up portion;
the second high modulus up ply comprises a second turn-up portion;
the third high modulus up ply comprises a third turn-up portion; and,
the fourth high modulus up ply comprises a fourth turn-up portion, wherein
the distance the first turn-up portion extends radially outward from the center of the bead core is about ⅓ of the diameter of the bead core;
the distance the second tune-up portion extends radially outward from the center of the bead core is greater than ½ of the diameter of the bead core and less than the distance the third turn-up portion extends radially outward from the center of the bead core;
the distance the third turn-up portion extends radially outward from the center of the bead core is greater than ½ of the diameter of the bead core and less than ½ of the radial height of the apex; and,
the distance the fourth turn-up portion extends radially outward from the center of the bead core is about ¼ of the diameter of the bead core.

4. The pneumatic tire of claim 1, wherein the tire comprises at least two from the group comprising:
(i) wherein the distance the first low modulus chipper extends radially outward from the center of the bead core is about ½ of the section height of the pneumatic tire;
(ii) wherein the distance the second low modulus chipper extends radially outward from the center of the bead core is greater than the height of the apex plus 1.5 inches and less than the distance the first low modulus chipper extends radially outward from the center of the bead core;
(iii) wherein the end of the second high modulus down ply is located a distance radially outward from the center of the bead core that is at least the radial height of the apex plus about 1.0 inches; and
(iv) wherein the end of the first high modulus down ply is located radially outward from the end of the second high modulus down ply and the end of the second low modulus chipper.

5. The pneumatic tire of claim 1, wherein the tire comprises at least three from the group comprising:
(i) wherein the distance the first low modulus chipper extends radially outward from the center of the bead core is about ½ of the section height of the pneumatic tire;
(ii) wherein the distance the second low modulus chipper extends radially outward from the center of the bead core is greater than the height of the apex plus 1.5 inches and less than the distance the first low modulus chipper extends radially outward from the center of the bead core;
(iii) wherein the end of the second high modulus down ply is located a distance radially outward from the center of the bead core that is at least the radial height of the apex plus about 1.0 inches; and
(iv) wherein the end of the first high modulus down ply is located radially outward from the end of the second high modulus down ply and the end of the second low modulus chipper.

6. The pneumatic tire of claim 1, wherein the tire comprises:
(i) wherein the distance the first low modulus chipper extends radially outward from the center of the bead core is about ½ of the section height of the pneumatic tire;
(ii) wherein the distance the second low modulus chipper extends radially outward from the center of the bead core is greater than the height of the apex plus 1.5 inches and less than the distance the first low modulus chipper extends radially outward from the center of the bead core;
(iii) wherein the end of the second high modulus down ply is located a distance radially outward from the center of the bead core that is at least the radial height of the apex plus about 1.0 inches; and
(iv) wherein the end of the first high modulus down ply is located radially outward from the end of the second high modulus down ply and the end of the second low modulus chipper.

7. The pneumatic tire of claim 6, wherein the first low modulus chipper extends at least 0.5 inches radially outward from the end of the first high modulus down ply; and,
the second low modulus chipper extends at least 0.5 inches radially outward from the end of the second high modulus down ply.

8. The pneumatic tire of claim 6, wherein the radial distance between the end of the second low modulus chipper and the end of the first high modulus down ply is at least 0.25 inches.

9. A method of constructing a pneumatic tire including the steps of:
(a) applying an inner-liner;
(b) applying a carcass structure, wherein the carcass structure comprises a carcass reinforcement portion that comprises a first high modulus up ply, a first high modulus down ply, a second high modulus down ply, a first low modulus chipper, and a second low modulus chipper,
wherein the second low modulus chipper is axially outward from the second high modulus down ply and extends at least 0.5 inches radially outward from the end of the second high modulus down ply,
wherein the first low modulus chipper is axially inward from the second high modulus down ply and axially outward from the first high modulus down ply and extends at least 0.5 inches radially outward from the end of the first high modulus down ply;
(c) applying a belt package; and,
(d) applying a tread structure.

10. The method of claim 9, wherein the radial distance between the end of the second low modulus chipper and the end of the first high modulus down ply is at least 0.25 inches.

* * * * *